STOWELL & MARCELLUS.
Corn Planter.
No. 8,877.　　　　　　　　　　　　　　　Patented Apr. 13, 1852.
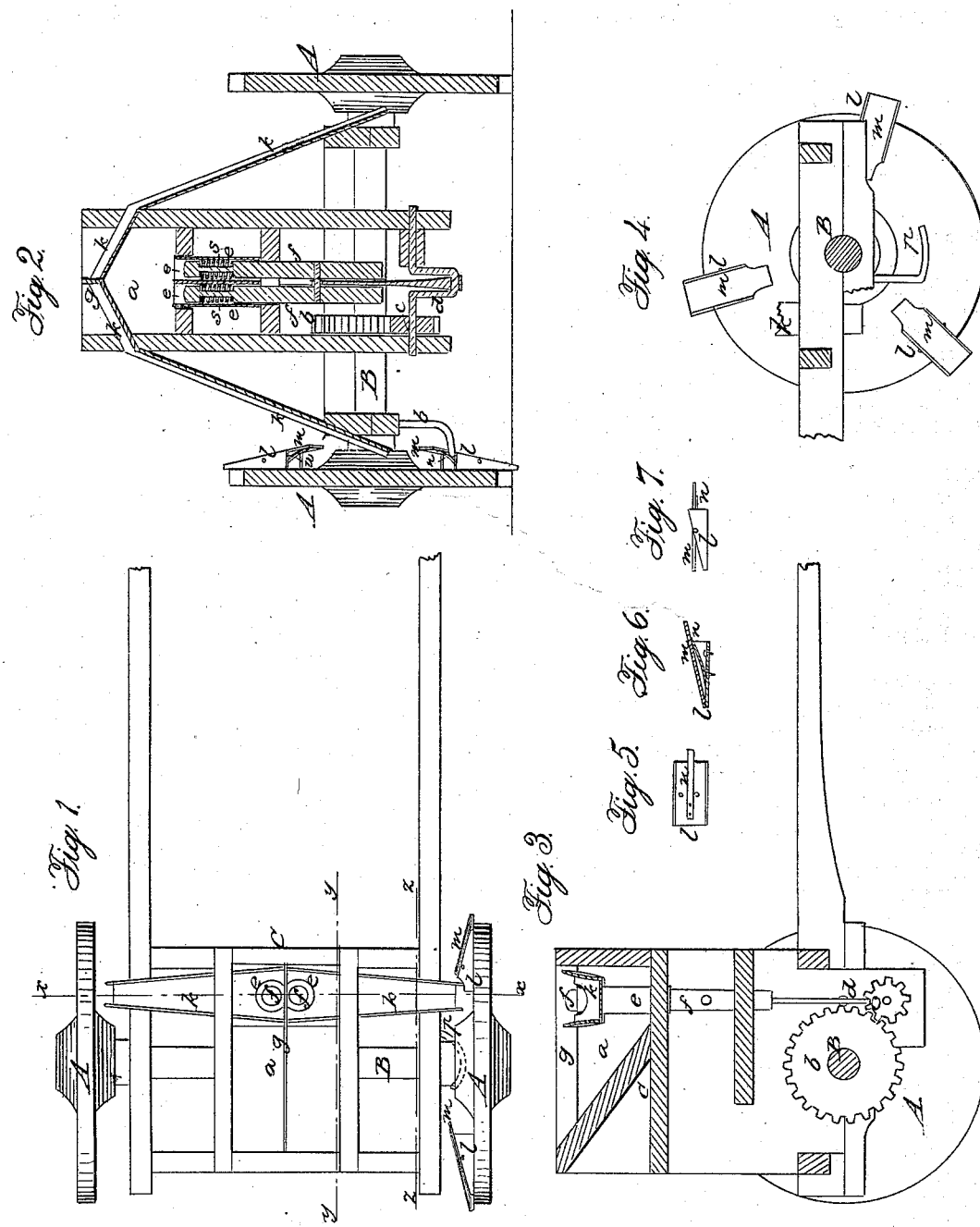

UNITED STATES PATENT OFFICE.

B. T. STOWELL AND A. MARCELLUS, OF WADDAM'S GROVE, ILLINOIS.

IMPROVEMENT IN SEED-PLANTERS.

Specification forming part of Letters Patent No. 8,877, dated April 13, 1852.

*To all whom it may concern:*

Be it known that we, B. T. STOWELL and A. MARCELLUS, both of Waddam's Grove, in the county of Stephenson and State of Illinois, have invented a new and Improved Corn-Planter; and we do hereby declare that the following is a full and exact description thereof, reference being had to the accompanying drawings, making part of this specification, in which—

Figure 1 is a top view of said corn-planter; Fig. 2, a transverse vertical section of the same in the line $x$ of Fig. 1; Fig. 3. a longitudinal vertical section in the line $y$ of Fig. 1; Fig. 4, a longitudinal vertical section in the line $z$ of Fig. 1; and Figs. 5, 6, and 7, top, sectional, and side views of a part detached.

Like letters refer to like parts in all the figures.

We employ a pair of wheels, A A, of convenient size to bear and work the apparatus, said wheels being fixed upon their axle B, which therefore revolves with them. The frame C, having the box or hopper $a$ in its upper part, is supported by bearings upon said axle. The cog-wheel $b$ on the axle B is geared into the pinion $c$, which moves the crank $d$, and consequently the pistons $ff$. Said pistons are partly inserted in and carry with them the movable tubes $e\ e$, the upper ends of which sink to the bottom of the hopper $a$ when the pistons are at the bottom of their stroke, as in Fig. 2, and rise to the bar $g$ when the pistons rise to the top of their stroke, as in Fig. 3. There is a partition, $i\ i$, in the upper part of each tube, having an aperture in its center, through which the slender neck $h\ h$ of each piston passes. Below these partitions, and between them and the shoulders of the pistons, are small coiled springs $s\ s$, which, when the tubes move freely, bring the heads of the pistons down against the said partitions, when there will be space enough in the upper parts of the tubes above the pistons to hold as many grains of corn as may be desired for each hill. When the pistons rise to the top of their stroke they reach somewhat higher than the bottom of the bar $g$, and hence out of the tubes $e\ e$, thereby expelling the grains of corn which were carried up into the spouts $k\ k$, which convey the grains, as they fall from the tubes, down near the wheels A A, to fall where desired.

On the inner side of one or both wheels A A, I attach dibbles $l\ l$, &c., at such a distance from one another as it is desired to plant the hills. Said dibbles are constructed with a bottom and two sides tapering to a point at the outer end, and a cover or lid, $m\ m$, &c., pivoted near its center. Springs $n\ n$, &c., are placed beneath the lids, so that they keep the outer ends of said lids closed, while the inner ends, being open, make flaring mouths to the dibbles. Said dibbles extend beyond the circumference of the wheels as far as the depth which it is desired to plant the corn. A guide, $p$, is attached to the frame so as to reach near the wheels immediately under the axle. It is so shaped and adjusted that the projecting handles of the lids $m\ m$, &c., as the wheels revolve, will be pushed by it toward the wheels as they approach the bottom of their revolution, thereby opening the outer ends of the dibbles and keeping them open for a short time till they begin to rise from out the ground. One or both wheels may be furnished with dibbles, according as it may be desired to plant one or two rows at a time. The wheels are placed at the same distance apart as the rows are intended to be planted when both wheels are furnished with dibbles.

The operation of our corn-planter is as follows, viz: The corn having been put into the hopper $a$, when the machine is drawn along, the wheels, revolving, cause the crank $d$ to revolve and move the pistons $ff$ and tubes $e\ e$ up and down through the corn in the hopper. Every time that said pistons descend, a proper number of grains fall into the tubes $e\ e$, and are carried up in the ascending stroke and thrown out by the pistons rising out of their tubes, and emptied into the spouts or conveyers $k\ k$. The cog-wheels which move the said crank are so proportioned and geared as to cause the open mouth of a dibble to be directly under each spout when the grains fall from them, and consequently receive said grains. Then, as the dibbles descend, their closed outer ends are sunk into the ground up to the periphery of the wheels by the weight of the machine. Just as the dibbles reach the lowest point their lids are raised by the guide $p$, and the grains in them fall out as they begin to ascend, and are buried by the earth which falls over them when the dibbles leave the ground, the lids immediately closing again, so as to exclude the dirt from the inside.

The great advantage of our machine is that it never clogs or becomes entangled with weeds, &c., which is the great objection to other corn-planters having a dragging movement. Its simplicity, exactness, and certainty of operation, together with its lightness of construction, are also strong recommendations.

What we claim as our invention, and desire to secure by Letters Patent, is—

1. The application of the dibbles $l\ l$, &c., constructed and arranged as described, to the peripheries of the wheels, and operating in the manner herein set forth.

2. The peculiar arrangement for feeding the seed to the hills, consisting substantially of the pistons $f\ f$ and tubes $e\ e$, regulated by the coiled springs $s\ s$ and bars $g\ g$, and operating as herein set forth.

The above specification of our improved corn-planter signed by us this 28th day of January, 1852.

B. T. STOWELL.
A. MARCELLUS.

Witnesses:
Z. C. ROBBINS,
J. S. BROWN.